Sept. 27, 1938.    G. W. VON HOFE    2,131,606
ADHESIVE APPLYING MEANS
Filed Feb. 6, 1937    2 Sheets-Sheet 1
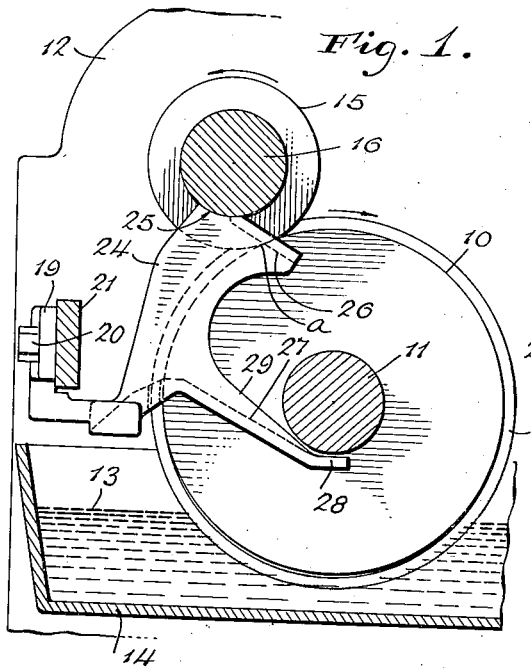
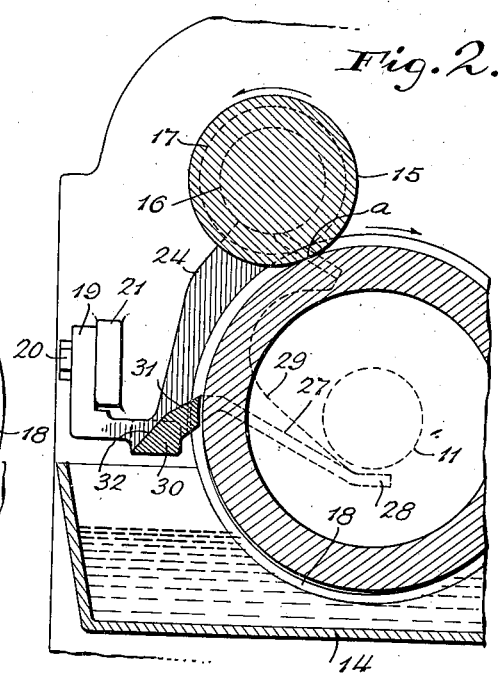
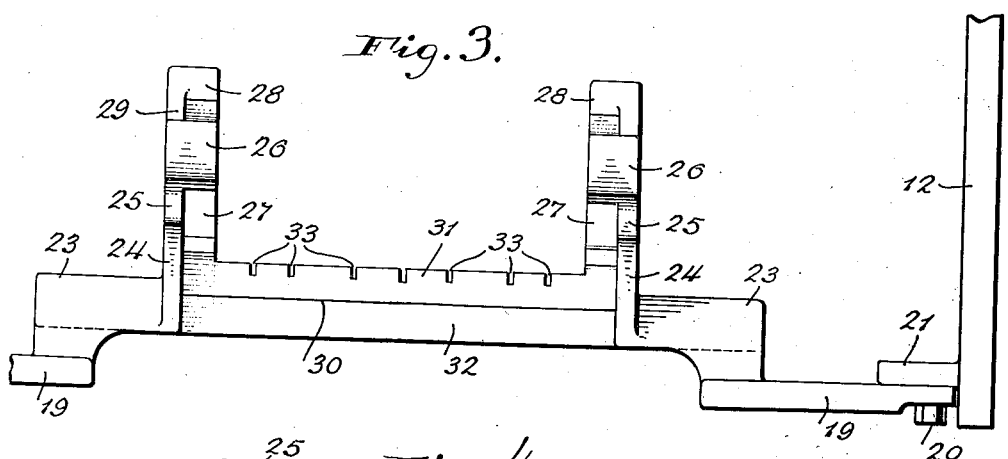
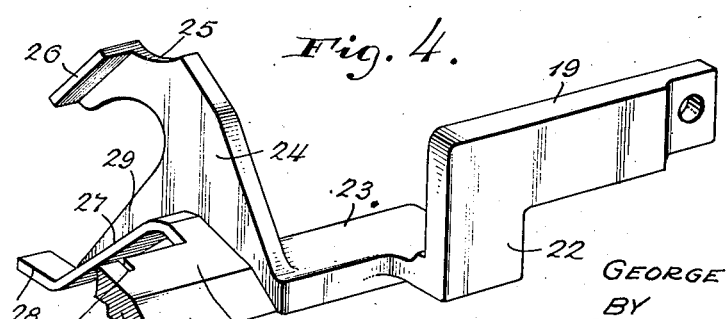
INVENTOR
GEORGE W. VON HOFE
BY
ATTORNEYS

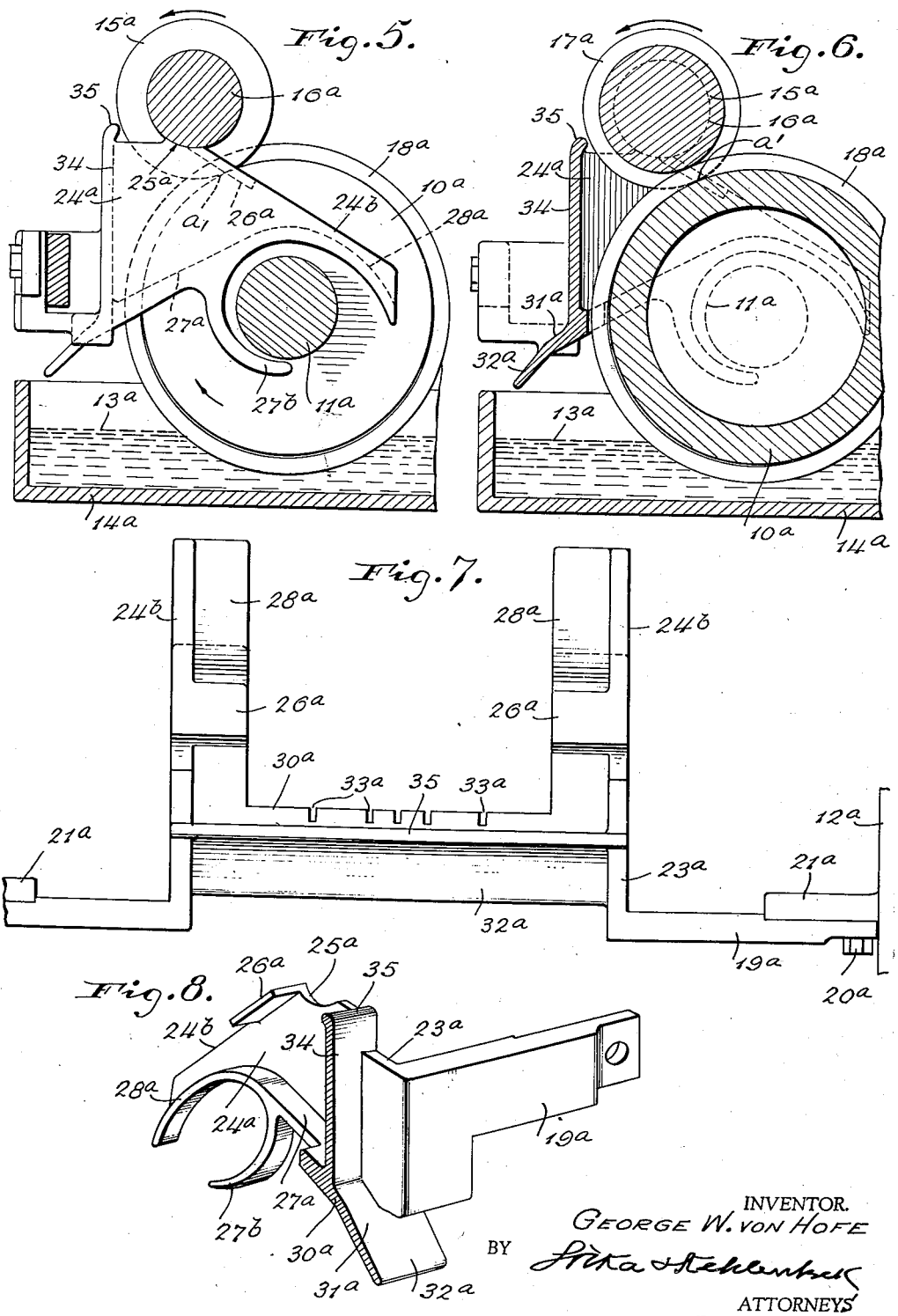

Patented Sept. 27, 1938

2,131,606

UNITED STATES PATENT OFFICE 2,131,606

ADHESIVE APPLYING MEANS

George W. von Hofe, Bound Brook, N. J., assignor to New Jersey Machine Corporation, Hoboken, N. J., a corporation of New Jersey Application February 6, 1937, Serial No. 124,373

6 Claims. (Cl. 91—50)

The invention relates to adhesive applying means of the type embodied in so-called gumming machines as exemplified by machines in which labels or their equivalent are provided with coatings of adhesive as a step in the operation of said machines. In practice such adhesive applying means in many instances comprises an adhesive distributing roll which distributes adhesive to a co-operating adhesive applying roll, the latter in turn serving to apply the adhesive to the labels or their equivalent in the form of adhesive coatings. Rolls of the indicated type are generally located in tangential operative relation to each other and during an operative period are likely to become soiled with adhesive or to develop undesirable churning of the adhesive as well as other objectionable features which reduce the efficiency of the mechanism.

The object of the invention is to provide a novel arrangement in which the adhesive applying means is automatically maintained in an operative condition of maximum efficiency at all times. The invention contemplates further the provision of a novel and simple means or device acting in co-operation with the adhesive distributing and applying rolls or their equivalent to prevent excessive churning of the adhesive and to keep said rolls clean and free from undesirable accumulations of adhesive.

Other more specific objects will appear from the description hereinafter and the features of novelty will be pointed out in the claims.

In the accompanying drawings, which illustrate examples of the invention without defining its limits, Fig. 1 is a fragmentary elevation with parts in section showing the novel arrangement in one form; Fig. 2 is a fragmentary sectional view; Fig. 3 is a detail plan view of the novel device shown in Figs. 1 and 2; Fig. 4 is a fragmentary perspective view thereof; Fig. 5 is a view similar to Fig. 1 showing another form of the device; Fig. 6 is a fragmentary sectional view thereof; Fig. 7 is a plan view of the novel device illustrated in Figs. 5 and 6, and Fig. 8 is a sectional perspective view thereof.

For purposes of illustration and description the novel device shown in Figs. 1 to 4 inclusive is illustrated in operative combination with adhesive applying means consisting of an adhesive distributing roll 10 which, in the example selected, is provided with trunnions 11 rotatably mounted on the frame 12 of the particular machine in any conventional manner. The distributing roll 10, as shown in Figs. 1 and 2, dips into a supply of adhesive 13 contained, for instance, in a suitable container 14 mounted in co-operative relation to said roll 10 in any well known manner.

The distribution roll 10 furthermore is mounted in tangential distributing relation to an adhesive applying roll 15 which, as a step in the operation of the particular machine in which the adhesive applying means is incorporated serves to apply the adhesive to labels or other equivalent in the form of adhesive coatings in conventional manner. The applying roll 15, in the form selected, is also provided with journals or trunnions 16 rotatably mounted in the particular machine in any well known way. To further illustrate the utility of the novel device the applying roll 15 is shown in a form, which in conventional manner, is provided in its cylindrical surface with a plurality of spaced circumferential grooves 17 into which extend, preferably at the upper part of the roll 15, the generally pointed ends of take-off members or stripper fingers. The latter may be of any well known type and arrangement and serve to separate or strip the adhesive coated labels or their equivalents from the roll 15 as is well understood; as the aforesaid take-off members or stripper fingers, per se, are well known and form no part of the instant invention, it has not been deemed necessary to illustrate the same in the drawings.

To prevent the adhesive distributed on the roll 15 by the roll 10 from accumulating in the grooves 17, the illustrated arrangement includes rings 18 loosely mounted on the distributing roll 10 and extending into the grooves 17 at the point of contact or nearest approach of the two rolls 10 and 15; it will be understood that each groove 17 has its individual co-operating ring 18, the arrangement being well known in many conventional and existing forms of adhesive applying means.

In the form shown in Figs. 1 to 4 inclusive, the novel device whereby the adhesive applying means is automatically maintained in an operative condition of maximum efficiency, consists of supporting brackets 19 whereby said device is mounted in operative relation to the rolls 10 and 15; for instance, as illustrated in Fig. 3, the brackets 19 may be detachably secured, by means of screws or the like 20, to lugs 21 provided at the proper points upon the frame 12 at opposite sides thereof. In practice the brackets 19 project toward each other from opposite sides of the frame 12 in parallel relation to the axes of the rolls 10 and 15 and in registry with each other. The specific arrangement illustrated in Fig. 4, shows the brackets 19 provided at their opposed inner ends with integral depending sections 22 which in turn comprise integral parts of horizontal sections 23 projecting from the sections 22 in directions toward the roll 10. The device in the form illustrated in Figs. 1 to 4 inclusive further includes upright members 24 preferably constituting integral parts of the sections 23 and located in spaced, parallel surface relation to the respective end faces of the rolls 10 and 15. The upright members 24 project upwardly from the sections 23 into contact with the trunnions 16 of the roll 15 and are provided with recesses 25 at their upper ends curved to fit the cylindrical surfaces of said trunnions 16 as shown in Fig. 1. In addition, the upright members 24 include upper scraper blades 26 projecting inwardly from said members 24 into contact with the respective end faces of the rolls 10 and 15; the blades 26 are preferably inclined downwardly toward the adhesive container 14 and are located so as to extend across the point a at which the rolls 10 and 15 are in tangential engagement with each other as illustrated in Fig. 1. The upright members 24 are further formed with lower scraper blades 27 extending inwardly from said members 24 into surface engagement with the respective end faces of the roll 10 and projecting beneath the trunnions 11 in the form of substantially horizontal terminal extensions 28 as shown in Fig. 1. The lower scraper blades 27 are inclined downwardly toward the extensions 28 and in addition to serving as scraper blades also, in co-operation with the end faces of the roll 10 and the contiguous portions 29 of the upright members 24, provide troughs sloping downwardly toward the adhesive container 14 for the purpose to be more fully set forth hereinafter. The novel device is completed in the form of an integral unit, which may be cast in suitable metal or otherwise constructed, by means of a connecting bar 30 which extends between the opposed inner faces of the upright members 24 preferably at the lower portions thereof, in parallel relation to the axis of the roll 10. In the preferred form the upper surface of the connecting bar 30 includes a downwardly inclined portion 31 merging into the upper surfaces of the lower scraper blades 27 at the points of connection therewith; in addition, the upper surface of said connecting bar 30 includes an edge portion 32 sloping downwardly toward the adhesive container 14 preferably at a steeper angle than that of the portion 31 as illustrated in Figs. 2 and 3.

When the adhesive applying means includes the rings 18 loosely mounted on the adhesive distributing roll 10, for instance as shown in Figs. 1 and 2, the connecting bar 30 may be designed to serve as a ring guide for maintaining said rings 18 in position on the roll 10 against unintentional displacement lengthwise thereof. In such case the bar 30 extends into relatively close proximity to the cylindrical surface of the roll 10 and is provided along its inner edge with recesses or notches 33 spaced apart and located in registry with the circumferential grooves 17 of the roll 15. The recesses or notches 33 are dimensioned and designed to individually accommodate the respective rings 18 which project into said recesses or notches 33 as illustrated in Figs. 1 and 2 and are automatically maintained thereby in proper operative relation to said grooves 17 and against axial displacement on the roll 10.

In the operation of the adhesive applying means illustrated in Figs. 1 and 2, the rolls 10 and 15 are rotated in the directions indicated by the arrows in any conventional manner. During such rotation the cylindrical distributing surface of the adhesive distributing roll 10, which moves in an operative arc, will pick up adhesive from the supply 13 and transfer the same to the cylindrical applying surface of the adhesive applying roll 15 which likewise moves in an operative arc and serves to apply such adhesive in the form of coatings to successive labels or the like as the latter are passed in surface contact with the adhesive applying surface of said roll 15 in any well known way. As these operations proceed, adhesive is oftimes squeezed or forced beyond the ends of the rolls 10 and 15 and in existing constructions spreads over said end faces; in addition, as the roll 10 passes through the adhesive supply 13, the end surfaces of said roll 10 similarly become coated with adhesive. In other words, the rolls 10 and 15, and more particularly the end faces thereof, become soiled with adhesive which interferes with the efficiency of the mechanism and results in unsatisfactory conditions of operation in the application of the adhesive coatings; in addition, such collected adhesive is in many instances transferred to other parts of the machine which accordingly becomes foul and consequently requires frequent and repeated cleanings to maintain it in an efficient condition.

These objections and disadvantages are avoided with the instant novel devices which reduce or entirely do away with periodic cleaning operations and consequently increase the productive capacities of the mechanisms in which the novel devices are incorporated.

In practice any adhesive which collects or is present on the end faces of the roll 10 because of the passage of said roll through the supply 13 will be carried upwardly on said end faces and will engage the lower scraper blades 27 which, by developing a scraping action upon said end faces remove the collected adhesive therefrom and prevent said adhesive from being carried beyond said lower scraper blades 27. As the roll 10 rotates adhesive will pass upward between it and the connecting bar 30 and through the notches 33 in quantity in excess of the amount of adhesive capable of passing between the rolls 10 and 15. This excess adhesive collects in the entrant angle between the two rolls 10 and 15 and gradually works its way lengthwise of said rolls to the end faces thereof. Such adhesive will be carried by the rolls 10 and 15 into engagement with the upper scraping blades 26 and scraped thereby from said end faces of said rolls 10 and 15; because of the fact that the upper scraper blades 26 extend across the point a at which the rolls 10 and 15 are in contact with each other, such objectionable or collected adhesive is prevented from passing beyond said blades 26 and between the rolls 10 and 15 and thereby is prevented from soiling the mechanism or otherwise disturbing the efficiency thereof. In other words, by locating the blades 26 at the point a where the rolls 10 and 15 are in tangential contact with each other, the blades 26 are in uninterrupted contact with the end faces of said rolls 10 and 15. Similarly, any adhesive which may collect upon the cylindrical surfaces of the trunnions 16 will be scraped therefrom by the action of the upper scraper blades 26 the ends of which are in scraping contact with the cylindrical surfaces of said trunnions 16 as shown in Fig. 1. As the collected adhesive is thus scraped away by the action of the upper scraper blades 26, this adhesive will be deflected thereby and caused to follow the motion of the roll 10 and thus be returned to the supply 13; any adhesive on the end faces of the roll 10 which is carried thereby above the supply 13 will be scraped from said end faces by the lower scraper blades 27.

By providing the cross bar 30 with the notches or recesses 33 for the accommodation of the rings 18, the latter may be made very narrow in transverse section with the result that the co-operating grooves 17 of the roll 15 may be correspondingly narrow transversely; it will be understood that in such case the customary take-off members or stripper fingers may also be of minimum transverse width with the result that the uncoated strips on the labels or other equivalent resulting from the presence of the aforesaid elements are correspondingly narrow so that the surfaces of said labels or other equivalent are most efficiently coated with adhesive throughout practically their entire extent and blank spaces free from adhesive and of objectionable width are entirely done away with.

The novel device in the form illustrated in Figs. 5 to 8 inclusive is shown in operative combination with adhesive applying means similar to that of Figs. 1 and 2, and comprising an adhesive distributing roll 10ª journalled in suitable bearings, for instance, by means of trunnions 11ª, on the frame 12ª. The distributing roll 10ª dips into a supply of adhesive 13ª contained in a suitably supported container 14ª and is located in tangential distributing relation to an adhesive applying roll 15ª. The latter is suitably journalled on the frame 12ª by means of trunnions 16ª and, as in the form first described, may also include a plurality of spaced circumferential grooves 17ª in its cylindrical surface for the accommodation of customary take-off members or stripper fingers in the conventional manner. The adhesive applying means being described includes rings 18ª loosely mounted on the roll 10ª and extending into the grooves 17ª, one for each groove, at the point of contact or nearest approach of the two rolls 10ª and 15ª; the rings 18ª prevent adhesive from accumulating in the grooves 17ª in the same way as set forth in connection with the form first described herein.

In the second example as shown in Figs. 5 to 8 inclusive, the novel device whereby the adhesive applying means is maintained in an operative condition of maximum efficiency consists of supporting brackets 19ª arranged for connection, for instance by means of screws or the like 20ª, with lugs 21ª provided at the proper points upon the frame 12ª. As in the form first described the brackets 19ª project toward each other from opposite sides of the frame 12ª in parallel relation to the axes of the rolls 10ª and 15ª and in registry with each other.

As shown in Figs. 7 and 8 the brackets 19ª at their opposed inner ends are provided with integral upright sections 23ª which, preferably, constitute integral parts of said brackets 19ª and project therefrom at substantially right angles. The device, in the form now being described, includes an upright guard plate 34 which extends between and is carried by the sections 23ª preferably as an integral part thereof; the upper edge 35 of the guard plate is preferably curved and rounded for the purpose to be more fully described hereinafter. In addition to the parts so far referred to, the device of Figs. 5 to 8 inclusive, includes upright members 24ª corresponding to the members 24 of the first form and likewise preferably comprising integral parts of the associated elements.

In practice the upright members 24ª project into contact with the trunnions 16ª of the roll 15ª and are provided with recesses 25ª at their upper ends curved to fit the cylindrical surface of said trunnions 16ª as illustrated in Fig. 5. The upright members 24ª furthermore are provided with upper scraper blades 26ª projecting inwardly from said members 24ª into engagement with the respective end faces of the rolls 10ª and 15ª; as in the form first described the upper scraper blades 26ª preferably incline downwardly and are located so as to extend across the point a' at which the rolls 10ª and 15ª are in contact with each other as shown in Fig. 5.

In the example illustrated in Figs. 5 to 8 inclusive, main lower scraper blades 27ª extend inwardly from the upright members 24ª into surface engagement with the respective end faces of the rolls 10ª and 15ª. Instead however of projecting beneath the trunnions of the adhesive distributing roll as in the form first described, the main lower scraper blades 27ª extend above the trunnions 11ª of the adhesive distributing roll 10ª and terminate in downwardly curved extensions 28ª as clearly shown in Fig. 5. As shown in Fig. 5 the upright members 24ª extend beyond the upper scraper blades 26ª and terminate in extensions 24ᵇ; the scraper blades 27ª and their extensions 28ª in co-operation with the end faces of the roll 10ª and the upright members 24ª and their extensions 24ᵇ also provide troughs for the adhesive as in the form first described. In addition, auxiliary lower scraper blades 27ᵇ, preferably of curved form, project from the main blades 27ª and extend beneath the trunnions 11ª as illustrated in Fig. 5; it will be understood that the auxiliary lower scraper blades 27ᵇ also extend into surface engagement with the respective end faces of the roll 10ª when the novel device is operatively combined with the adhesive applying means for which it is designed.

The novel device as shown in Figs. 5 to 8 includes a connecting bar 30ª which preferably constitutes an integral part of the associated elements and, in practice is located in parallel relation to the roll 10ª; the bar 30ª and the guard plate 34 complete the unit which may be cast in suitable metal or otherwise produced as in the first form. As illustrated in Figs. 6 and 8 the connecting bar 30ª may have its upper surface formed with downwardly inclined portions 31ª and 32ª similar to the portions 31 and 32 of Figs. 2 and 4.

In the form under discussion the connecting bar 30ª may serve as a ring guide and in such case may extend into relatively close proximity to the cylindrical surface of the roll 10ª and be provided with recesses or notches 33ª spaced apart and located in registry with the circumferential grooves 17ª of the roll 15ª. In such case the recesses or notches 33ª correspond in number to the number of grooves 17ª and dimensioned and designed to individually accommodate the respective rings 18ª. Each of the latter project into a co-operating recess or notch 33ª whereby said rings 18ª are all automatically maintained in proper operative relation to the associated grooves 17ª and against axial displacement on the roll 10ª.

In the example shown in Figs. 5 to 8 inclusive, the roll 10ª and 15ª correspond in operation and function to the operation and purpose of the rolls 10 and 15 of the form first described. In the arrangement now under discussion, any adhesive which may collect upon the end faces of the roll 10ᵃ due to its passage through the supply 13ᵃ will be scraped from said surfaces by the scraping action of the main lower scraper blades 27ᵃ assisted by the scraping action of the auxiliary lower scraper blades 27ᵇ. As in the form first referred to, any adhesive which may pass upwardly between the roll 10ᵃ and the connecting bar 30ᵃ and through the notches or recesses 33ᵃ will be removed by the scraping action of the upper scraper blades 26ᵃ. The latter as in the form first mentioned, will also function to remove any adhesive which may collect upon the end faces of the roll 15ᵃ or upon the cylindrical surfaces of the trunnions 16ᵃ. The upper scraping blades 26ᵃ extend across the point a' at which the rolls 10ᵃ and 15ᵃ are in contact with each other and thus also prevent any collected adhesive from escaping and passing between the two rolls 10ᵃ and 15ᵃ to soil the mechanism or otherwise interfere with the efficiency thereof. Such adhesive as may be removed by the scraping action of the upper scraper blades 26ᵃ will as in the first form be deflected thereby and caused to follow the motion of the roll 10ᵃ and thus returned to the supply 13ᵃ. During periods of rest adhesive collected at the upper scraper blades 26ᵃ or at adjacent points on the end surfaces of the rolls may drip downwardly upon the upper surfaces of the main lower scraper blades 27ᵃ and will be returned thereby to the supply 13ᵃ in the container 14ᵃ. Any adhesive which may be carried upon the end surfaces of the roll 10ᵃ in a circular path beginning at the upper surfaces of the main lower scraping blades 27ᵃ will be removed by the scraping action of the downwardly curved extensions 28ᵃ and will be caused thereby to pass back to the supply 13ᵃ. The scraper blades 27ᵃ and the extensions 28ᵃ thereof will prevent any adhesive, including drippings thereof during rest periods from reaching the trunnions 11ᵃ. The upper surfaces of the auxiliary lower scraper blades 27ᵇ also serve to assist in collecting objectionable adhesive and returning it to the container 14ᵃ. In the instant form of the novel device any label or its equivalent which for some reason might be carried around upon the surface of the roll 15ᵃ will be deflected by the rounded and curved edge 35 of the guard plate 34 and thus prevented from passing between the roll 15ᵃ and 10ᵃ to thereby clog the mechanism or otherwise interfere with its intended operation.

In all of its forms the novel device eliminates excessive churning of adhesive which is one of the serious disadvantages of existing machines and at the same time serves automatically to remove any adhesive present on portions of the mechanism other than the adhesive applying surface of the rolls 15 and 15ᵃ prior to the application of an adhesive coating by the applying surface of the rolls 15 and 15ᵃ; objectionable adhesive is correspondingly removed from parts of rolls 10 and 10ᵃ other than the distributing surfaces thereof and from the roll trunnions. The rolls or their equivalent are thereby automatically maintained in conditions of maximum cleanliness and other parts of the machine are correspondingly prevented from becoming contaminated or soiled with adhesive. The novel device accordingly increases the productivity of the machines in which it is incorporated and avoids the necessity for periodic cleaning and consequent shut down during the progress of the cleaning operations.

Various changes in the specific forms shown and described may be made within the scope of the claims without departing from the spirit of the invention.

I claim:

1. The combination of an adhesive distributing roll having a cylindrical adhesive distributing surface, an adhesive applying roll having a cylindrical adhesive applying surface in receiving relation to the adhesive distributing surface of said distributing roll and arranged to apply coatings of adhesive to predetermined elements, and a unitary device for maintaining said rolls in a predetermined condition of operative efficiency, said unitary device consisting of upright members located respectively in spaced surface parallelism with the opposite end faces of said rolls, a connecting bar extending between said upright members in parallel relation to the axes of said rolls, upper scraper blades extending from said upright members into scraping engagement with the end faces of said rolls, and lower scraper blades projecting from said upright members into scraping engagement with the end faces of distributing roll and extending both over and underneath the trunnions of said distributing roll, said scraper blades being arranged to automatically remove adhesive unintentionally present on said end faces.

2. In adhesive applying means including an adhesive transferring roll and an adhesive applying roll in tangential engagement therewith, that improvement which comprises a unitary device consisting of supporting brackets, upright members carried by said brackets in spaced surface parallelism with the end faces of said rolls, a connecting bar extending between said upright members in contiguous parallel relation to the cylindrical surface of said distributing roll, a plurality of scraper members projecting from each of said upright members into scraping engagement with the end faces of said rolls for automatically removing adhesive unintentionally present on said end faces, and an upright guard plate extending between said upright members and having its upper edge in parallel proximity to the cylindrical surface of said applying roll.

3. In adhesive applying means including an adhesive transferring roll and an adhesive applying roll in tangential engagement therewith, that improvement which comprises a unitary device consisting of supporting brackets, upright members carried by said brackets in spaced surface parallelism with the end faces of said rolls, a connecting bar extending between said upright members in contiguous parallel relation to the cylindrical surface of said distributing roll, a plurality of scraper members projecting from each of said upright members into scraping engagement with the end faces of said rolls for automatically removing adhesive unintentionally present on said end faces, and an upright guard plate extending between said upright members and having its upper edge rounded and curved into parallel proximity to the cylindrical surface of said applying roll.

4. In adhesive applying means including an adhesive applying roll provided with spaced circumferential grooves in its cylindrical surface, an adhesive distributing roll in tangential engagement with said applying roll, and rings loosely mounted on said distributing roll and extending into said grooves at the point of tangential engagement of said rolls, that improvement which comprises a unitary device consisting of scraping means located in scraping engagement with the end faces of said rolls for automatically removing adhesive unintentionally present on said end faces, and a connecting bar extending between said scraping means in contiguous parallel relation to the cylindrical surface of said distributing roll, said connecting bar being provided with recesses for individually accommodating said rings to maintain the same against displacement on said distributing roll.

5. The combination of a container for adhesive, an adhesive roll dipping into said container to receive adhesive therefrom, trunnions whereby said roll is rotatably supported, and scraper blades engaging the end faces of said roll to remove adhesive therefrom, said scraper blades having portions extending above and over said trunnions in protective relation thereto and inclined downwardly toward said container for protecting said trunnions against contamination by removed adhesive and for deflecting the latter back toward said container.

6. The combination of a container for adhesive, an adhesive roll dipping into said container to receive adhesive therefrom, trunnions whereby said roll is rotatably supported, and scraping means engaging the end faces of said roll to remove adhesive therefrom, said scraping means having portions extending above and over said trunnions in protective relation thereto and inclined downwardly toward said container and other portions extending underneath said trunnions in protective relation thereto whereby said trunnions are protected from above and below against contamination by adhesive and whereby removed adhesive is deflected back toward said container.

GEORGE W. von HOFE.